US006491064B2

(12) United States Patent
Kampe

(10) Patent No.: US 6,491,064 B2
(45) Date of Patent: Dec. 10, 2002

(54) APPARATUS FOR CHARGING A LIQUID MEDIUM WITH A GAS

(76) Inventor: Juergen Kampe, Salchauer Strasse 5, D-39343 Sueplingen (DE)

( * ) Notice: Subject to any disclaimer, the term of this patent is extended or adjusted under 35 U.S.C. 154(b) by 0 days.

(21) Appl. No.: 09/731,436

(22) Filed: Dec. 6, 2000

(65) Prior Publication Data

US 2002/0066489 A1 Jun. 6, 2002

(51) Int. Cl.[7] .............................. F04F 5/42; C02F 7/00
(52) U.S. Cl. ........................ 137/888; 137/896; 417/171
(58) Field of Search ................................ 137/888, 896, 137/897, 898; 417/171

(56) References Cited

U.S. PATENT DOCUMENTS 2,872,297 A * 2/1959 Dugan ........................ 137/887
3,230,972 A * 1/1966 Davis ......................... 137/896
5,005,605 A * 4/1991 Kueffer et al. .............. 137/896

FOREIGN PATENT DOCUMENTS

DE 19933680 C1 * 12/2000

* cited by examiner

*Primary Examiner*—Stephen M. Hepperle
(74) *Attorney, Agent, or Firm*—Karl Hormann

(57) ABSTRACT

An apparatus for injecting a gaseous medium into a flowing liquid medium consisting of a first pipe having a closed end facing against the direction of the flowing liquid and an open end disposed in the direction of liquid flow, a second pipe coaxially disposed with the first pipe and having an open end extending through the closed end of the first pipe and a closed end inside the first pipe and a plurality of elongate apertures in its periphery adjacent the closed end and a substantially rectangular pipe entering the first pipe at an acute angle to introduce liquid into an annular gap between the first and second pipe in a substantially helical flow pattern traversing the elongate apertures thereby to draw air from the second pipe through the elongate apertures into the liquid.

5 Claims, 2 Drawing Sheets

APPARATUS FOR CHARGING A LIQUID MEDIUM WITH A GAS

BACKGROUND OF THE INVENTION

1. Field of the Invention

The invention, in general, relates to an apparatus for charging flowing liquid media, for the aeration and/or gas injection thereof, with a gas and, more particularly, for the activation or restoration of bodies of water and for the inducement of chemical and biochemical reactions.

2. The Prior Art

It is known to inject gases into, or to aerate, liquid media and, in particular, sewage by the injection of compressed air from rigid or rotating nozzles submersed in the flowing liquid medium.

The drawback of using rotating nozzles is that they require significant expenditures in terms of equipment for compressor plants, agitators or raking apparatus as well as construction.

The use of rigid or stationary jets disposed at the bottom of a tank or liquid body suffers from the disadvantage that such nozzles are quickly soiled or congested by sedimentation so that their effectiveness and the overall performance of the equipment is reduced.

Furthermore, ejectors or ejector nozzles aerators are known which are operated by high-pressure pumps. The disadvantage of such apparatus is that special fluids are required in case the solids contents or viscosity of the treated liquid are too high.

A drawback common to all known apparatus is that in addition to requiring extensive expenditures in terms of equipment they consume large amounts of energy and require frequent maintenance.

OBJECTS OF THE INVENTION

It is a general object of the invention to provide an apparatus for aerating, or injecting gas into, flowing liquid media A further object of the invention is to provide an apparatus of the kind referred to which may be realized with relatively insignificant expenditures in terms of equipment.

Still another object of the invention is to provide an apparatus of the kind referred to which may be operated at low levels of power consumption.

Yet another object of the invention is to provide an apparatus of the kind referred to which for its operation draws upon the energy of flow inherent in treated flowing liquid.

It is also an object of the invention to provide an aeration or gas injection apparatus the low energy consumption of which results from making additional use of the kinetic inherent in the energy of flow of the treated liquid.

It is a further object of the invention to provide an aeration and gas injection apparatus which is durable and reliable.

Yet another object of the invention is to provide an apparatus for aerating, or injecting a gas into, a liquid which yields the lowest possible energy consumption at the lowest possible economic expenditure.

BRIEF SUMMARY OF THE INVENTION

In the accomplishment of these and other objects, the invention provides an apparatus for charging a liquid medium with a gas.

BRIEF DESCRIPTION OF THE DRAWINGS

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

DESCRIPTION OF THE PREFERRED EMBODIMENTS

Figure 2:
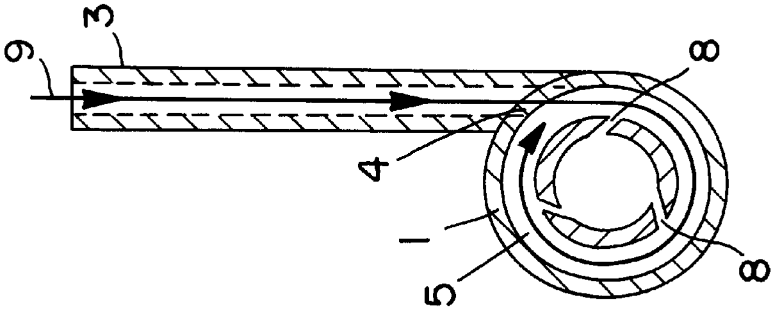
FIG. 2 is a section along line A—A of the apparatus of FIG. 1.
Figure 1:
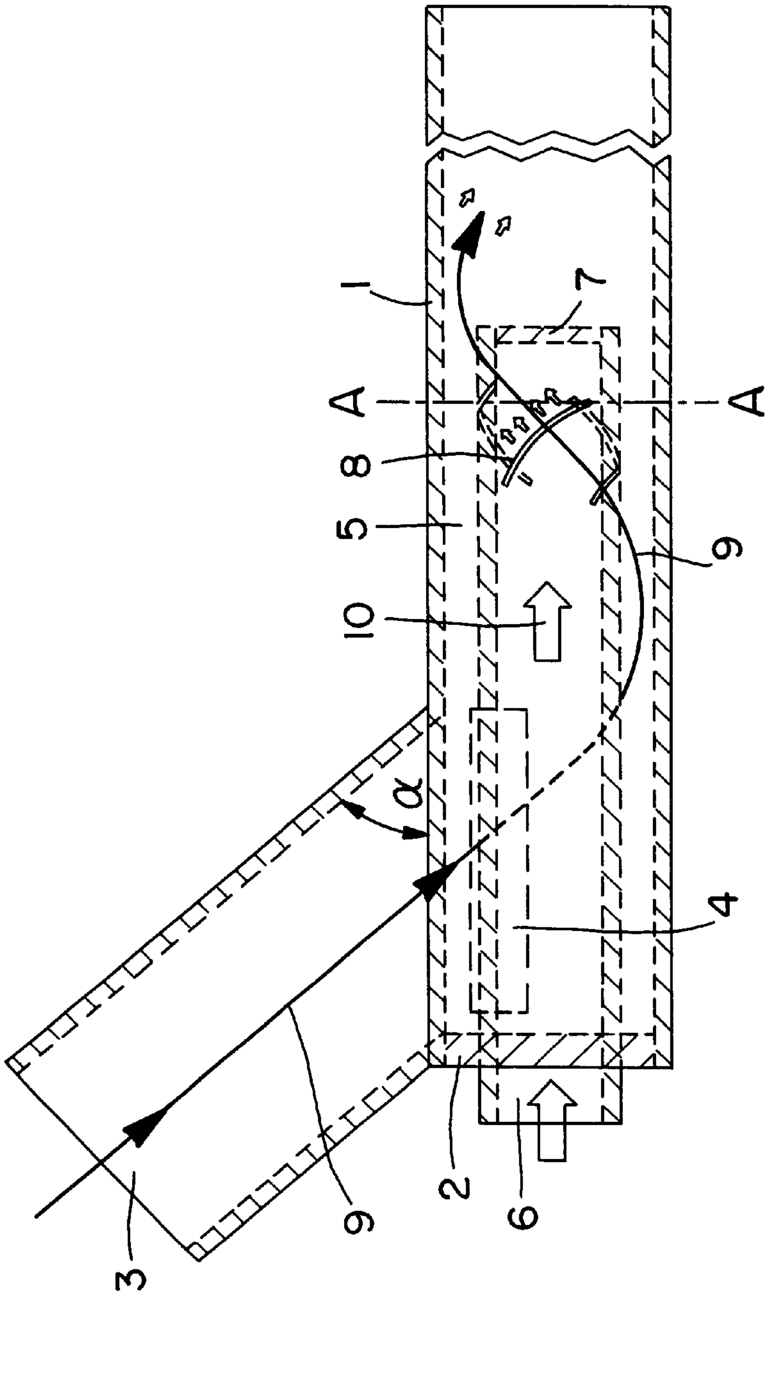
FIG. 1 depicts an apparatus in accordance with the invention in longitudinal section.
Figure 4:
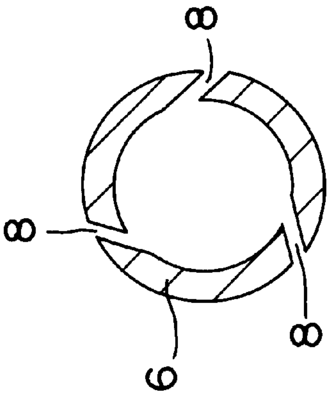
FIG. 4 is a detailed schematic presentation of the nozzle design of FIG. 3.
Figure 3:
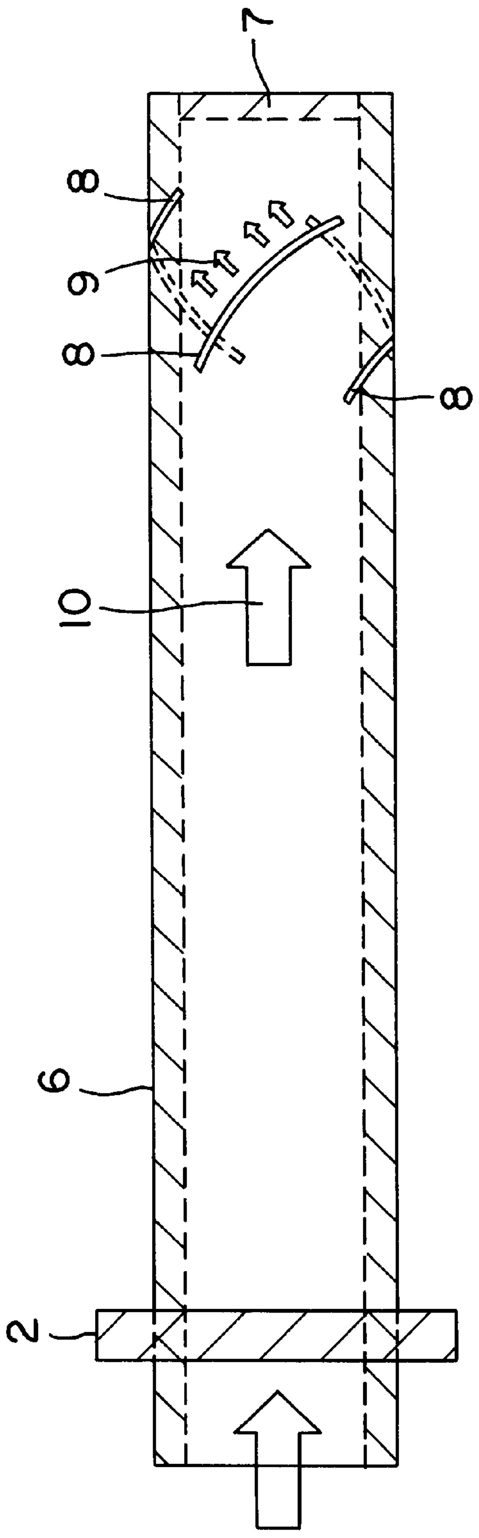
FIG. 3 depicts the arrangement of the nozzles in the suction tube of the apparatus of FIG. 1 on an enlarged scale.

The apparatus is intended for aerating clarified flowing waste water (liquid medium 9).

The apparatus consists of a pump pipe 1 which constitutes the housing of the apparatus. The pipe 1 is open at an end in the direction of the waste water (liquid medium 9) flow. At its other end, facing the direction of flow, the pipe 1 is closed by a closure 2.

Disposed coaxially within the pump pipe 1 and extending through the closure 2 thereof, there is provided a suction pipe 6 to feed air (gaseous medium 10) required for aerating the waste water (liquid medium 9). The connection between the closure 2 and the suction pipe 6 is sealed. The end 7 of the suction pipe disposed in the direction of flow is closed. Its other end extending through the closure 2 is open and connected to a suitable source of air (nor shown). A plurality of uniformly spaced elongate apertures 8 functioning as nozzles for mixing air or gas and liquid medium or waste water in a manner to be described are provided in the periphery of the suction pipe 6 near the end 7 thereof. The nozzles are disposed at an angle of about 45° relative to the longitudinal axis of the suction pipe 6. Waste water (liquid medium 9) flowing in the pump pipe 1 thus traverses these apertures 8. The elongate apertures 8 are designed such that their trailing edge forms an acute angle with respect to waste water (liquid medium 9) flowing thereacross.

A drive pipe 3 is provided at one side of an imaginary median plane disecting the pump pipe 1 and is sealingly connected thereto. The drive pipe 3 the open end of which is connected to a suitable source (nor shown) of the waste water (liquid medium 9) is flat and of substantially rectangular cross section and enters the pump pipe I through an intake opening 4 at an acute angle relative to the axis of the pipe, in the direction of waste water flow. The angle is preferably between 30° and 60°. The connection between the drive pipe 3 and the pump pipe 1 is such that the interior surface of one side wall of the drive pipe 3 tangentially engages the internal surface of the pump pipe 1 and the internal surface of the opposite sidewall of the drive pipe 3 is tangentially aligned with the outer surface of the suction pipe 6, i.e. the gap formed between the internal surfaces of the sidewalls equals the width of an annular gap formed between the outer surface of pipe 6 and the internal surface of pipe 1. The length of the side walls of the intake opening 4 is the quotient resulting from dividing the cross sectional surface area of the intake opening 4 by the height of the annular gap 5 between the outer surface of the suction pipe 6 and the inner surface of the pump pipe 1.

When operating the apparatus in accordance with the invention, the waste water (liquid medium 9) to be aerated constitutes the drive fluid. It flows at an acute angle through the drive pipe 3 and the intake opening 4 into the pump pipe 1 and in so doing enters the annular gap 5 which results in a drop of flow pressure while avoiding impact pressure. As a result of the configuration of pump pipe 1, drive pipe 3 and suction pipe 6 and the arrangement and dimensions thereof the waste water (liquid medium 9) in the annular gap 5 takes on a substantially helical flow pattern and traverses the elongate apertures 8 in the periphery of the suction pipe 6. This leads to the generation of vacuum pressure at the trailing edges of the elongate apertures 8 which in turn leads to air (gaseous medium 10) being sucked in which is finely dispersed in the waste water (liquid medium 9). Turbulence arises as a result of the widened cross section at the end 7 of the suction tube 6. This intensifies a further homogeneous mixing of air (gaseous medium 10) and waste water (liquid medium 9) to a reactive liquid and gas mixture and thus to an optimum surface increase of the waste water (liquid medium 9).

What is claimed is:

1. An apparatus for injecting gas a into liquid medium flowing in a predetermined direction, comprising:

an elongate pump pipe extending along a predetermined axis and having a closed end facing the flowing liquid medium and an open end disposed in the direction of the flowing liquid;

an elongate air suction pipe coaxially disposed within the pump pipe to form an annular gap between the internal surface of the pump pipe and the external surface of the suction pipe and having a closed end disposed in the direction of the open end of the pump pipe and an open end extending through the closed end of the pump pipe for connection to a source of air, the suction pipe being provided in its periphery adjacent its closed end with a plurality of uniformly spaced elongate apertures;

an elongate liquid medium drive pipe of substantially rectangular cross section having one end connected to a source of liquid medium and another end connected at an acute angle relative to the axis to the pump pipe through a rectangular opening remote from the apertures such that an internal surface of a sidewall of the drive pipe tangentially engages the internal surface of the pump pipe and the internal surface of the opposite sidewall of the drive pipe is tangentially aligned with the external surface of the suction pipe.

2. The apparatus of claim 1, wherein the drive pipe is provided with a liquid intake opening facing generally in the direction of the flowing liquid.

3. The apparatus of claim 2, wherein acute angle between drive pipe and pump pipe is such as to impart a helical flow pattern to liquid entering into annular gap.

4. The apparatus of claim 3, wherein the elongate apertures are disposed in the suction pipe so as to intersect the helical flow pattern of the liquid.

5. The apparatus of claim 4, wherein the elongate apertures are provided with acutely angled edges facing in the direction of the helical flow pattern.

* * * * *